US009294232B2

(12) United States Patent
Östergaard et al.

(10) Patent No.: US 9,294,232 B2
(45) Date of Patent: Mar. 22, 2016

(54) ENABLING AND DISABLING INTEGRITY PROTECTION FOR DATA RADIO BEARERS

(75) Inventors: Jessica Östergaard, Stockholm (SE); Gunnar Mildh, Sollentuna (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 50 days.

(21) Appl. No.: 13/265,378

(22) PCT Filed: Sep. 16, 2011

(86) PCT No.: PCT/SE2011/051115
§ 371 (c)(1),
(2), (4) Date: Aug. 3, 2012

(87) PCT Pub. No.: WO2012/078092
PCT Pub. Date: Jun. 14, 2012

(65) Prior Publication Data
US 2012/0307709 A1    Dec. 6, 2012

Related U.S. Application Data

(60) Provisional application No. 61/421,806, filed on Dec. 10, 2010.

(51) Int. Cl.
*H04L 1/16* (2006.01)
(52) U.S. Cl.
CPC .................................. *H04L 1/1685* (2013.01)
(58) Field of Classification Search
None
See application file for complete search history.

(56) References Cited

U.S. PATENT DOCUMENTS

| | | | |
|---|---|---|---|
| 2010/0074182 A1* | 3/2010 | Shao | 370/328 |
| 2010/0098011 A1* | 4/2010 | Pelletier et al. | 370/329 |
| 2010/0184438 A1* | 7/2010 | Wu | 455/436 |
| 2010/0191965 A1* | 7/2010 | Fischer et al. | 713/168 |
| 2011/0028150 A1* | 2/2011 | Kone | 455/436 |
| 2011/0188408 A1* | 8/2011 | Yi et al. | 370/254 |
| 2011/0263221 A1* | 10/2011 | Yi et al. | 455/410 |
| 2012/0147830 A1* | 6/2012 | Lohr et al. | 370/329 |
| 2013/0210384 A1* | 8/2013 | Zhang | 455/410 |

OTHER PUBLICATIONS

International Search Report mailed Jun. 1, 2012 in International Application No. PCT/SE2011/051115.

(Continued)

*Primary Examiner* — Diane Lo
(74) *Attorney, Agent, or Firm* — Baker Botts, LLP (57) ABSTRACT

The present invention relates to a method in a receiving node and a sending node of a wireless communications system for enabling and disabling integrity protection of at least one data radio bearer between the sending node and the receiving node. The method in the receiving node comprises, following a successful connection re-establishment between the sending node and the receiving node, receiving a connection reconfiguration message from the sending node, the connection reconfiguration message comprising an indicator indicating which ones of the at least one data radio bearers that shall have enabled integrity protection. It also comprises enabling integrity protection of packets on the at least one data radio bearer indicated by the indicator, and disabling integrity protection of packets on the rest of the at least one data radio bearers.

21 Claims, 6 Drawing Sheets

(56) References Cited

OTHER PUBLICATIONS

"3rd Generation Partnership Project; Technical Specification Group Services and System Aspects; 3GPP System Architecture Evolution (SAE); Security Architecture (Release 9)", 3GPP Draft; 33401-950; 3rd Generation Partnership Project (3GPP), vol. SA WG3, Oct. 4, 2010; XP050459866.
NTT DoCoMo et al: "Call Setup Procedure for LTE—IDLE to LTE—ACTIVE", 3GPP Draft; R2-061268, 3rd Generation Partnership Project (3GPP), Mobile Competence Centre; vol. RAN WG2, No. , May 3, 2006, XP050131213.
"3rd Generation Partnership Project; Technical Specification Group core Network and Terminals; Mobile Radio Interface Signalling Layer 3; General Aspects (Release 9)", 3GPP Standard; 3GPP TS 24.007, 3rd Generation Partnership Project (3GPP), Mobile Competence Centre; No. V9.0.0, Dec. 14, 2009, pp. 1-49, XP050400796.
3GPP TSG-RAN WG2 Meeting #72bis; Dublin, Ireland; Title: RRC Impact due to S1/X2 IP.

* cited by examiner

Transmit connection reconfiguration message following a successful connection re-establishment, the message comprising indicator indicating which ones of the data radio bearers that shall have enabled integrity protection — 610

ENABLING AND DISABLING INTEGRITY PROTECTION FOR DATA RADIO BEARERS

This application is the U.S. national phase of International Application No. PCT/SE2011/051115, filed 16 Sep. 2011, which designated the U.S. and claims the benefit of U.S. Provisional Application No. 61/421,806, filed 10 Dec. 2010, the entire contents of each of which are hereby incorporated by reference.

TECHNICAL FIELD

The technology relates to receiving and sending nodes of a wireless communications system, and in particular, to wireless communications systems with a capability to protect the integrity of data transmissions over a data radio bearer between the receiving and sending nodes.

BACKGROUND

Figure 1:
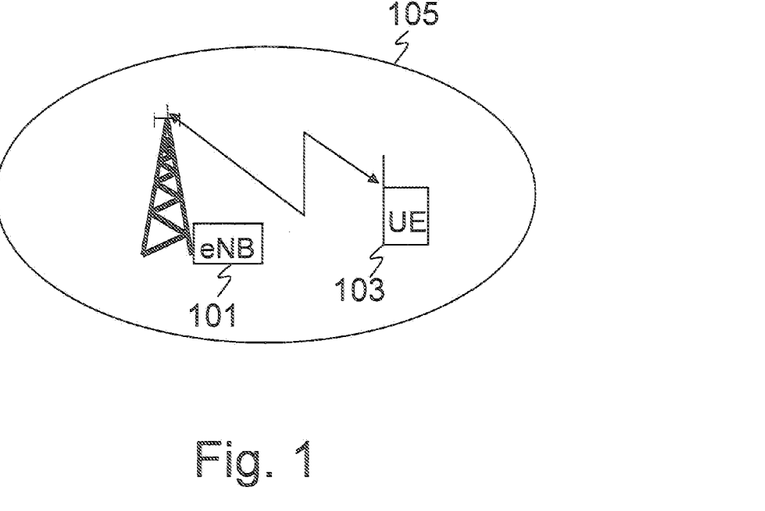
FIG. 1 is a schematic illustration of an eNB and a UE in a wireless communications system.

FIG. 1 shows a cellular communication system with a serving node 101 that serves a user equipment (UE) 103 located within the serving node's geographical area of service, called a cell 105. Depending on the system, the serving node 101 may e.g. be a base station, a Node B, or an evolved Node B (eNodeB or eNB). Hereinafter, the serving node 101 will be referred to as an eNB in the non-limiting example of a long term evolution (LTE) system. Communication is bidirectional between the eNB 101 and the UE 103. Communications from the eNB 101 to the UE 103 are referred to as taking place in a downlink direction, whereas communications from the UE 103 to the eNB 101 are referred to as taking place in an uplink direction.

Figure 2:
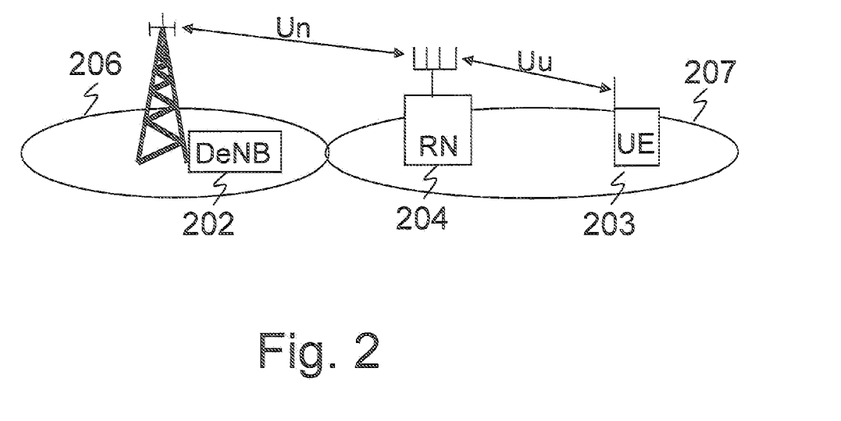
FIG. 2 is a schematic illustration of a DeNB, a RN and a UE in a wireless communications system.

Relay nodes may also be used in a wireless communications system. FIG. 2 illustrates a relay node (RN) 204 with a service area or cell 207, the RN 204 communicating with a donor eNB (DeNB) 202 with a service area or cell 206, and one or several UEs 203 located within the RN's cell 207. Transmissions between UE 203 and RN 204 are done over a radio interface denoted Uu, which is the same as for regular eNB to UE communication, so from a UE perspective the RN appears as a regular eNB. Transmissions between the RN 204 and the DeNB 202 are made over a radio interface denoted Un, which reuses much of the functionality of the Uu interface. This means that the DeNB 202 handles the RN 204 as a UE, using similar protocols as when communicating with a UE with some additions.

Figure 3:
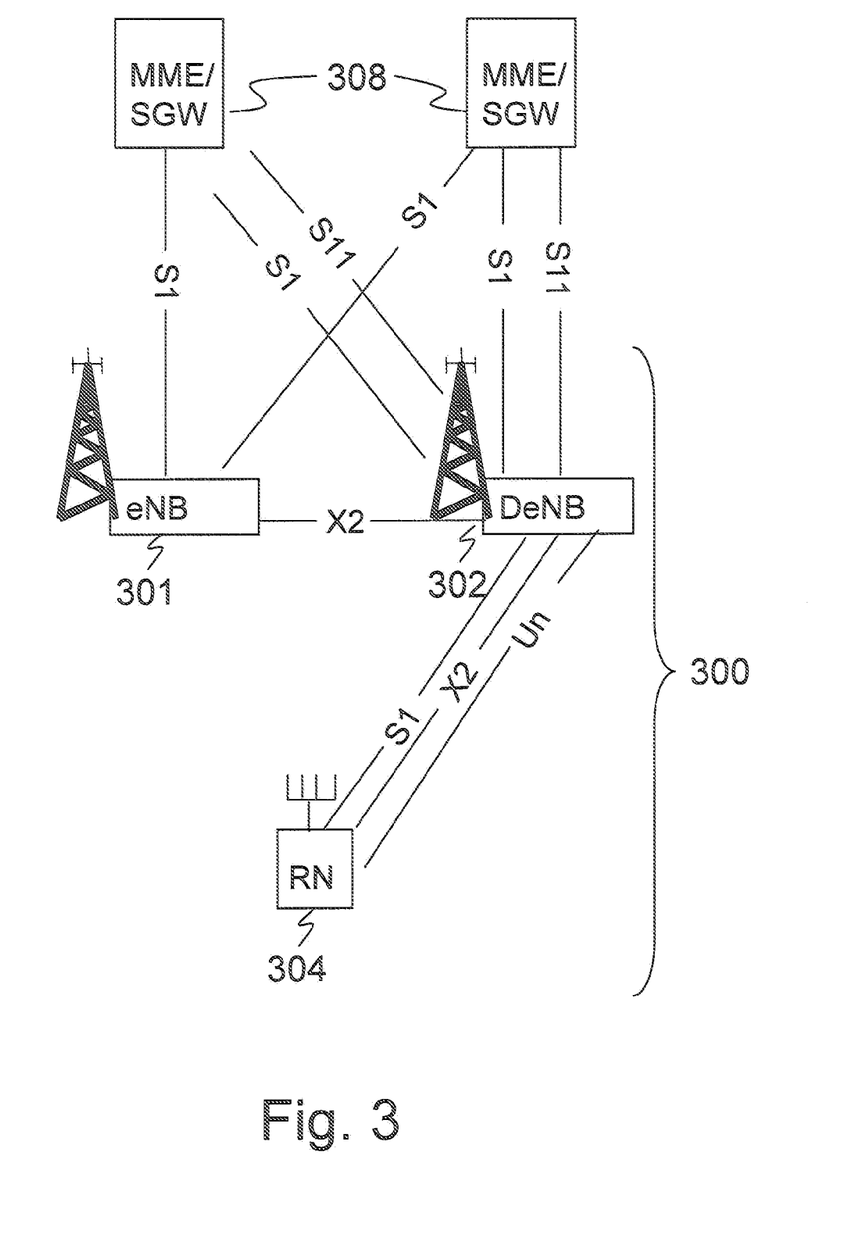
FIG. 3 is a schematic illustration of the architecture with DeNB, a RN in a wireless communications system.

To function as an eNB in an LTE system, the RN 304 has an S1 interface setup towards the core network with the mobility management entity (MME) and/or service gateway (SGW) 308, which is proxied in the DeNB 302. The RN 304 may also have an X2 interface setup towards other eNBs 301, in which case the X2 interface is proxied in the DeNB 302. The architecture is shown in FIG. 3. The eNBs 301, the DeNBs 302, and the RN 304 are all part of the evolved universal terrestrial radio access network (E-UTRAN) 300, which is the radio network of the LTE system.

The 3GPP LTE Rel-10 work item description for a relay or RN includes the following characteristics. First, a RN control cells 207 (see illustration in FIG. 2), each of which appears to a UE as a separate cell distinct from the DeNB cell 206. Second, those RN controlled cells have their own Physical Cell IDs as defined in LTE Rel-8, and the RN transmits its own synchronization channels, and reference symbols. Third, the UE receives scheduling information and hybrid automatic repeat request (HARQ) feedback directly from the RN and sends its control channel information such as scheduling requests (SR), channel quality index (CQI), and acknowledgements (ACK) to the RN. Fourth, there should preferably not be any UE impact from the RN functionality so that legacy LTE UEs can be served by the RN cell 207.

It is desirable to support integrity protection of RN signaling and/or data between the RN and DeNB. One option is to implement this integrity protection in the packet data convergence protocol (PDCP) layer described in the 3GPP specifications as a relay-specific functionality in the PDCP layer. In such a case, the setup and configuration of the integrity protection will be done by the RRC protocol. The enabling and disabling of PDCP integrity protection—sometimes also referred to as activation and disabling of integrity protection—may be made per data radio bearer (DRB), meaning that not all DRBs would necessarily be configured to use integrity protection at a given time.

Integrity protection in PDCP may use a unique sequence number (SN) as input to the integrity protection algorithm for every, packet that is protected. This makes the integrity verification code different even for identical packets sent at different times on the same DRB as they have different SN. The complete SN used as input for integrity protection, such as a COUNT value, may not be transmitted with every packet in order to avoid unnecessary overhead. Instead, only a part of the least significant bits of this SN value—typically 7 or 12 bits which are called a PDCP SN—are transmitted in each packet. The transmitter and receiver then implicitly keep track of the remaining bits of the complete sequence number, i.e. the 25 or 20 bits that are called overflow counter or hyper frame number. This requires that the receiver increments the overflow counter every time the PDCP SN wraps around, e.g., goes from a count value 1111111→0000000.

In prior art it is proposed to support enabling of integrity protection at DRB setup. However, the proposal only allows the possibility to change the integrity protection, i.e. enable or disable the integrity protection, for an ongoing bearer at a handover. Changing the integrity protection of a DRB during normal operation is deemed too complex since it is difficult to coordinate the change of integrity protection with the ongoing traffic on the DRB, e.g., due to re-transmissions, which may lead to that some packets will be protected and some will not. One concern is that this may make it difficult for the receiver to know if integrity protection has been applied to a given packet or not.

According to the proposal, it is thus only possible to enable or disable the integrity protection at initial DRB setup, at handover, or by releasing the DRB and setting up a new DRB to carry the traffic. The new bearer may be configured with or without integrity protection depending on what is desired, independently of the configuration of the previous DRB. However, releasing and setting up a new bearer is a complex procedure which also introduces a delay. Furthermore, there is no support for lossless and duplicate-free data delivery since packets related to the old DRB, which may have been transmitted by the transmitter but so far not received by the receiver, will be discarded by the radio protocols when the old DRB is released.

A possible solution to the problem of loosing packets when releasing and setting up a new DRB, is to trigger an intra-cell handover to enable or disable integrity protection for an ongoing DRB. However, performing an intra-cell handover only for the sake of enabling or disabling the integrity protection of one or more DRBs causes unnecessary data transfer interruption which introduces delays, as well as unnecessary load on the random access channel since a random access procedure is always part of a handover. Furthermore, an intra-cell handover is an unnecessarily complex solution.

Another possible way to support enabling or disabling of integrity protection of a DRB during normal operation in prior art is to include an indication in the PDCP header indicating if integrity protection is applied to a given packet. This however introduces additional overhead in the PDCP header and could potentially be abused by an "attacker", which may manipulate a packet which is integrity-protected by changing the indication in the PDCP header to say that it is not protected.

SUMMARY

It is therefore an object to address some of the problems outlined above, and to allow for reconfiguration of integrity protection of a DRB other than at initial DRB setup and handover, without loosing any packets and adding any complexity and/or delays. This object and others are achieved by the methods and the sending and receiving nodes according to the independent claims, and by the embodiments according to the dependent claims.

In accordance with a first embodiment, a method in a sending node of a wireless communications system for supporting enabling and disabling of integrity protection of at least one data radio bearer between the sending node and a receiving node is provided. The method comprises, following a successful connection re-establishment between the sending node and the receiving node, transmitting a connection reconfiguration message to the receiving node. The connection reconfiguration message comprises an indicator indicating which ones of the at least one data radio bearers that shall have enabled integrity protection.

In accordance with a second embodiment, a method in a receiving node of a wireless communications system for enabling and disabling integrity protection of at least one data radio bearer between a sending node and the receiving node is provided. The method comprises, following a successful connection re-establishment between the sending node and the receiving node, receiving a connection reconfiguration message from the sending node. The connection reconfiguration message comprises an indicator indicating which ones of the at least one data radio bearers that shall have enabled integrity protection. The method further comprises enabling integrity protection of packets on the at least one data radio bearer indicated by the indicator, and disabling integrity protection of packets on the rest of the at least one data radio bearers.

In accordance with a third embodiment, a sending node for a wireless communications system is provided. The sending node is configured to support enabling and disabling of integrity protection of at least one data radio bearer between the sending node and a receiving node. The sending node comprises a transmitter configured to transmit a connection reconfiguration message to the receiving node following a successful connection re-establishment between the sending node and the receiving node. The connection reconfiguration message comprises an indicator indicating which ones of the at least one data radio bearers that shall have enabled integrity protection.

In accordance with a fourth embodiment, a receiving node for a wireless communications system is provided. The receiving node is configured to enable and disable integrity protection of at least one data radio bearer between a sending node and the receiving node. The receiving node comprises a receiver configured to receive a connection reconfiguration message from the sending node following a successful connection re-establishment between the sending node and the receiving node. The connection reconfiguration message comprises an indicator indicating which ones of the at least one data radio bearers that shall have enabled integrity protection. The receiving node also comprises a processing unit configured to enable integrity protection of packets on the at least one data radio bearer indicated by the indicator, and to disable integrity protection of packets on the rest of the at least one data radio bearers.

An advantage of embodiments is that it makes it possible to enable and disable integrity protection of an ongoing DRB not only of handover but also at RRC connection re-establishment.

Other objects, advantages and features of embodiments will be explained in the following detailed description when considered in conjunction with the accompanying drawings and claims.

DETAILED DESCRIPTION

In the following, different aspects will be described in more detail with references to certain embodiments and to accompanying drawings. For purposes of explanation and not limitation, specific details are set forth, such as particular scenarios and techniques, in order to provide a thorough understanding of the different embodiments. However, other embodiments that depart from these specific details may also exist.

Embodiments are described in a non-limiting general context in relation to an LTE network applying integrity protection of a DRB between a RN and a UE. However, it should be noted that the embodiments may also be applied to other types of radio access networks where integrity protection of DRBs is used.

Although the technology below is described in the context of RNs connecting to a DeNB, the technology may also be used in other scenarios when integrity protection is used, e.g., for UEs connecting to a normal base station, such as an eNB and a Node B.

The problem of how to allow a reconfiguration of integrity protection for an ongoing DRB without adding complexity and delays, and without loosing any data packets, is addressed by a solution where a DeNB transmits a message to a RN for a reconfiguration of the connection directly following a successful connection re-establishment between the DeNB and the RN, and where the message comprises an indicator which indicates which one of the DRBs that shall have enabled integrity protection. The RN can then enable and disable the integrity of the DRBs according to the indicator, when they are resumed after the re-establishment.

This solution makes it possible to enable or disable the integrity protection of DRBs at RRC connection re-establishment without introducing additional complexity related to handling of the data transmissions on the DRB. All data transmissions are suspended during the RRC re-establishment period which means that the receiver can determine if a packet was sent prior to or after the integrity protection enabling or disabling. The technology also allows lossless packet delivery during the reconfiguration of integrity protection because the DRB is not released.

The integrity protection of a DRB may thus be changed at RRC connection re-establishment, which means that the integrity protection of a DRB may be changed at times other than at DRB setup and at handover. RRC connection re-establishment may occur, for example, when the RN experiences a radio link failure which may be due to various problems with the radio link. Furthermore, RRC connection re-establishment may occur when the RN loses synchronization of the overflow counter, when the RN fails to verify the integrity of incoming packets, or when the RN fails to implement an RRC connection reconfiguration. Hereinafter, three non-limiting example scenarios where it may be beneficial to enable or disable integrity protection on one or more DRBs are described, also including the signaling during the re-establishment. These three scenarios are described to illustrate the technology and some advantages of it.

Scenario 1:

In this scenario it is assumed that integrity protection is applied for a DRB but the RN and the DeNB lose synchronization of their overflow counters, e.g. due to too many packet losses. The integrity protection of the packets on the DRB will therefore fail. This failure may potentially cause the RN to perform an RRC connection re-establishment. At the time of re-establishment, it may be desirable for the DeNB to be able to switch off the integrity protection of this DRB in order to avoid further re-establishment attempts from the RN. By avoiding re-establishment attempts from the RN, control is given to the DeNB to solve the error case where the overflow counter synchronization is lost.

Scenario 2:

In this scenario it is assumed that an "attacker" is trying to manipulate the packets on the link between the RN and the DeNB. The RN may detect that some packets are modified, e.g., by detecting a jump in the SN, or unlikely values used for some protocol fields. This may trigger an RRC connection re-establishment. As a consequence of the re-establishment, the DeNB may enable integrity protection of some DRBs for extra security against the attack.

Scenario 3:

In this scenario it is assumed that a re-establishment occurs towards a DeNB cell with different support for DRB integrity protection than the previous DeNB cell had. For example, if a RN with all its DRB configured with integrity protection experiences a radio link failure in a DeNB cell 1, the RN may try to re-establish its RRC connection against a DeNB cell 2. This DeNB cell 2 may not support DRB integrity protection at all, or it may not have the processing capability to support integrity protection on all RN DRBs. Without the possibility to disable integrity protection at a re-establishment, the DeNB cell 2 must then reject the RRC reestablishment attempt or reject the DRBs that it cannot handle. By allowing reconfiguration of the integrity protection, this problem can instead be solved by accepting the re-establishment attempt and all DRBs, and disabling the integrity protection on the DRBs where it cannot be supported. In another situation, the DeNB cell 2 may only support integrity protected DRBs from a RN, and may then only accept the RRC re-establishment request if it may configure the integrity protection on the DRBs.

RRC Re-Establishment with Change of Integrity Protection:

During the RRC connection re-establishment procedure in E-UTRAN, all DRBs are suspended. To resume the DRBs, an RRC connection reconfiguration is performed. The DeNB transmits an indication for each DRB in the first RRC connection reconfiguration message after the RRC connection re-establishment. The indication indicates if integrity protection performed at transmission, and integrity verification performed at reception should be applied for that DRB. When the RN receives an indication that integrity protection/verification should be applied for a given DRB, the RN applies integrity protection/verification for all subsequent packets on this DRB. Integrity protection/verification is applied until either the DRB is released or the RN receives further indications that it should stop performing integrity protection/verification, e.g., at handover or at a further RRC connection re-establishment. The indication of integrity protection may e.g. be of the same kind as the corresponding indication sent to change the integrity protection at handover.

Figure 4A:
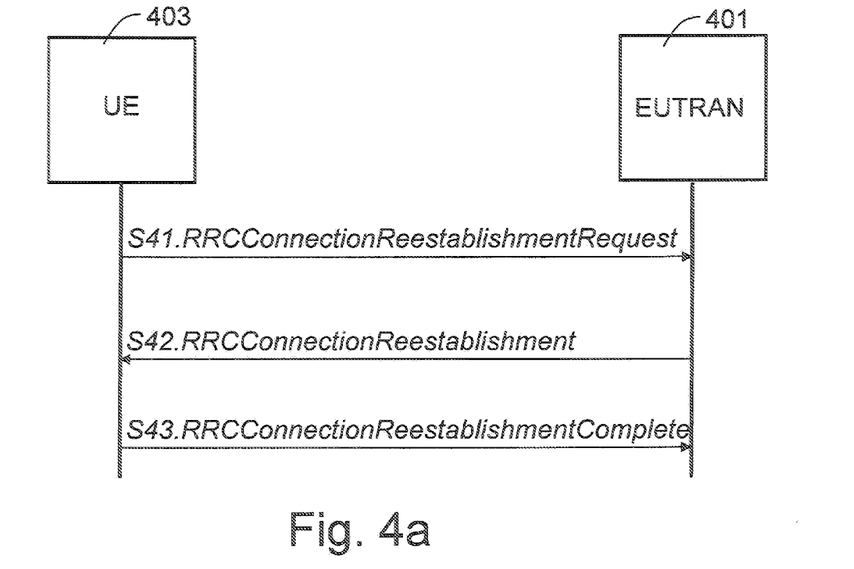
FIGS. 4a-b are signalling diagrams illustrating the RRC connection re-establishment procedure.
Figure 4B:
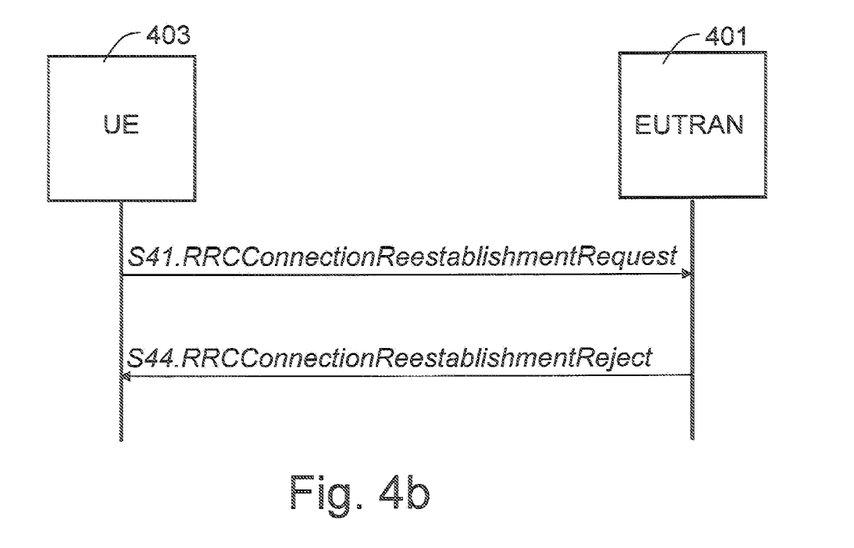

An illustration of the RRC connection re-establishment procedure in E-UTRAN is illustrated in FIGS. 4a and 4b. FIG. 4a illustrates a successful RRC connection re-establishment, and FIG. 4b illustrates an unsuccessful RRC connection re-establishment. In FIGS. 4a and 4b, an RRCConnectionReestablishmentRequest is transmitted, in S41, by the UE 403 to the E-UTRAN 401. In FIG. 4a, E-UTRAN returns an RRCConnectionReestablishment message in S42, and the UE responds with RRCConnectionRe-establishmentComplete in S43. The connection re-establishment is thus successful. If the E-UTRAN has to reject the re-establishment, an RRCConnectionReestablishmentReject is returned in S44 to the UE upon receiving the request in S41, as illustrated in FIG. 4b. FIGS. 4a and 4b show the interaction between the UE 403 and the E-UTRAN 401. However, in the case described above with a DeNB and a RN, FIGS. 4a and 4b may be interpreted as an illustration of the signaling between an RN and its DeNB during an RRC connection re-establishment procedure. The UE 403 may thus be replaced by the RN, and the E-UTRAN 401 by the DeNB.

Figure 5:
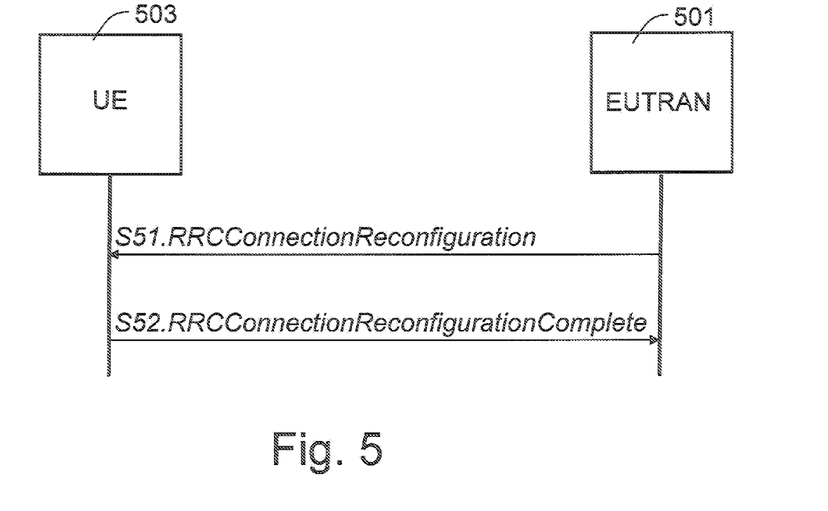
FIG. 5 is a signalling diagram illustrating the RRC connection reconfiguration procedure.

An RRC connection re-establishment request only succeeds if the cell (denoted E-UTRAN in the figures) is prepared for it, meaning that it has a valid UE context for the UE trying to re-establish its RRC connection. This means that the cell knows the DRB configuration of the UE trying to perform an RRC re-establishment. After successful completion of the RRC connection re-establishment procedure, all DRBs are suspended. To resume the DRBs, an RRC connection reconfiguration is sent as illustrated in FIG. 5. The connection reconfiguration procedure starts when the E-UTRAN 501 sends an RRCConnectionReconfiguration in S51 to the UE 503. The UE replies with an RRCConnectionReconfigurationComplete in S52. FIG. 5 shows the interaction between the UE 503 and the E-UTRAN 501. However, in the case of an RN connecting to a DeNB, FIG. 5 may be interpreted as an illustration of the signaling between the RN and the DeNB during the RRC connection reconfiguration. The UE 503 may thus be replaced by the RN, and the E-UTRAN 501 by the DeNB. There is also a failure case of the RRC connection reconfiguration, not illustrated here, which is applicable if the UE or RN is unable to comply with the configuration.

According to one embodiment, the indication of integrity protection is included per DRB, within the RRCConnectionReconfiguation message in S51. However, other connection reconfiguration messages may be envisaged, as long as it is a reconfiguration message that follows upon a connection re-establishment, with the purpose of resuming the DRBs after a suspension due to the re-establishment. The indication of integrity protection allows enabling integrity protection for the DRB, if previously disabled; disabling integrity protection for the DRB, if previously enabled; and keeping integrity protection enabled or disabled, as before the re-establishment and the reconfiguration. The procedure for changing the integrity protection at re-establishment may be the same for all scenarios described above.

Figure 6:
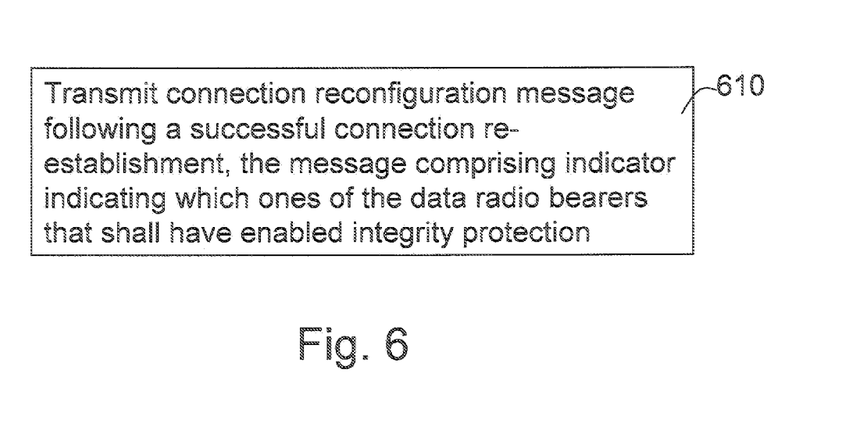
FIG. 6 is a flowchart of the method in the sending node according to embodiments.

FIG. 6 is a flowchart of a method in the sending node of a wireless communications system for supporting enabling and disabling of integrity protection of one or more DRBs between the sending node and a receiving node. In embodiments, the sending node may be a radio base station, and the receiving node may be a RN or a UE.

The method comprises, following a successful connection re-establishment between the sending node and the receiving node:

610: Transmitting a connection reconfiguration message to the receiving node. The connection reconfiguration message comprises an indicator indicating which ones of the DRBs that shall have enabled integrity protection.

The transmitted connection reconfiguration message is in one embodiment an RRC connection reconfiguration message following an RRC connection re-establishment. However, other messages for reconfiguring the connection may be envisaged in alternative embodiments. Integrity protection comprises in one embodiment:

Adding an integrity protection checksum to a transmitted packet.
Verifying an integrity protection checksum in a, received packet.
Discarding the received packet when the verification of the integrity protection checksum fails.

The verification of the integrity protection checksum comprises calculating an authentication code for integrity based on some input parameters and comparing it with the checksum received in the packet. If they correspond to each other, the verification is successful.

Figure 7:
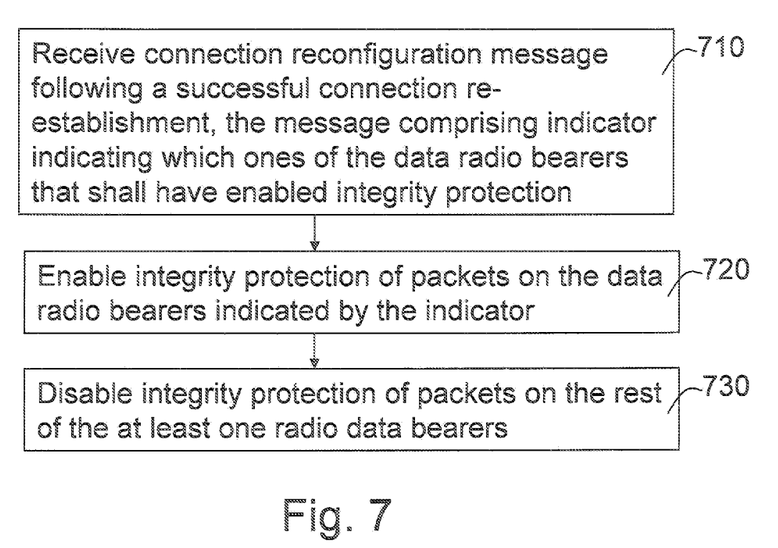
FIG. 7 is a flowchart of the method in the receiving node according to embodiments.

FIG. 7 is a flowchart of a method in a receiving node of a wireless communications system for enabling and disabling integrity protection of one or more DRBs between a sending node and the receiving node. In embodiments, the sending node may be a radio base station, and the receiving node may be a RN or a UE. The method comprises, following a successful connection re-establishment between the sending node and the receiving node:

710: Receiving a connection reconfiguration message from the sending node. The connection reconfiguration message comprises an indicator indicating which ones of the DRBs that shall have enabled integrity protection.
720: Enabling integrity protection of packets on the DRBs indicated by the indicator. The packets transmitted on the indicated DRBs will thus now be integrity protected, regardless of if they were integrity protected before the connection re-establishment or not.
730: Disabling integrity protection of packets on the rest of the DRBs. No integrity protection will be used on the DRBs that were not indicated to have enabled integrity protection, regardless of if they were integrity protected before the connection re-establishment or not.

The received connection reconfiguration message is in one embodiment an RRC connection reconfiguration message following an RRC connection re-establishment. However, other messages for reconfiguring the connection may be envisaged in alternative embodiments. Integrity protection comprises in one embodiment:

Adding an integrity protection checksum to a transmitted packet.
Verifying an integrity protection checksum in a received packet.
Discarding the received packet when the verification of the integrity protection checksum fails.

Figure 8A:
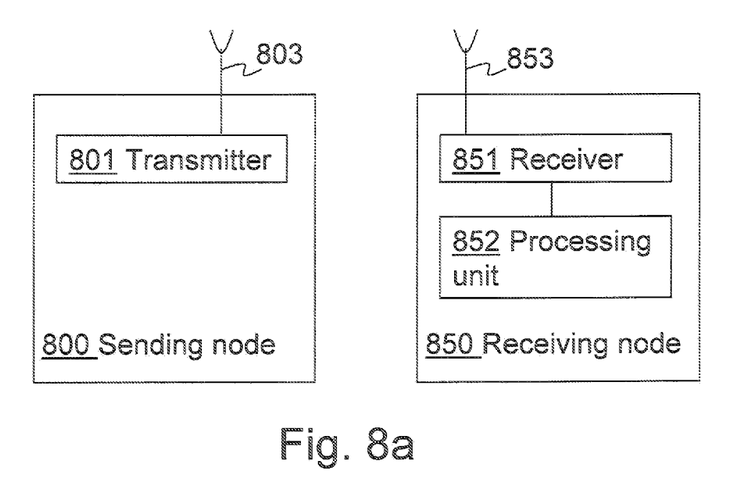
FIGS. 8a-b are block diagrams illustrating the sending and receiving nodes according to embodiments.

A sending node 800 and a receiving node 850 for a wireless communications system are schematically illustrated in the block diagram in FIG. 8a according to embodiments. In embodiments, the receiving node may be a RN or a UE. In either case, the sending node May, be a radio base station. The sending node 800 is configured to support enabling and disabling of integrity protection of one or more DRBs between the sending node and the receiving node 850. The sending node comprises a transmitter 801 configured to transmit a connection reconfiguration message to the receiving node following a successful connection re-establishment between the sending node and the receiving node. The connection reconfiguration message comprises an indicator indicating which ones of the DRBs that shall have enabled integrity protection. In FIG. 8a, the transmitter 801 is connected to an antenna 803 via an antenna port. However, there may be more than one antenna and/or antenna ports.

In one embodiment, the transmitted connection reconfiguration message is an RRC connection reconfiguration message following an RRC connection re-establishment. Integrity protection comprises in one embodiment:

Adding an integrity protection checksum to a transmitted packet.
Verifying an integrity protection checksum in a received packet.
Discarding the received packet when the verification of the integrity protection checksum fails.

The receiving node 850 illustrated in FIG. 8a is configured to enable and disable integrity protection of one or more DRBs between the sending node 800 and the receiving node. The receiving node comprises a receiver 851 configured to receive a connection reconfiguration message from the sending node following a successful connection re-establishment between the sending node and the receiving node. The connection reconfiguration message comprises an indicator indicating which ones of the DRBs that shall have enabled integrity protection. The receiver 851 is connected to an antenna 853 via an antenna port. However, there may be more than one antenna and/or antenna ports.

The receiving node also comprises a processing unit 852 configured to enable integrity protection of packets on the DRBs indicated by the indicator, and to disable integrity protection of packets on the rest of the DRBs. The received connection reconfiguration message is in one embodiment an RRC connection reconfiguration message following an RRC connection re-establishment. Integrity protection comprises in one embodiment:

Adding an integrity protection checksum to a transmitted packet.
Verifying an integrity protection checksum in a received packet.
Discarding the received packet when the verification of the integrity protection checksum fails.

The units described above with reference to FIG. 8a may be logical units, separate physical units or a mixture of both logical and physical units.

Figure 8B:
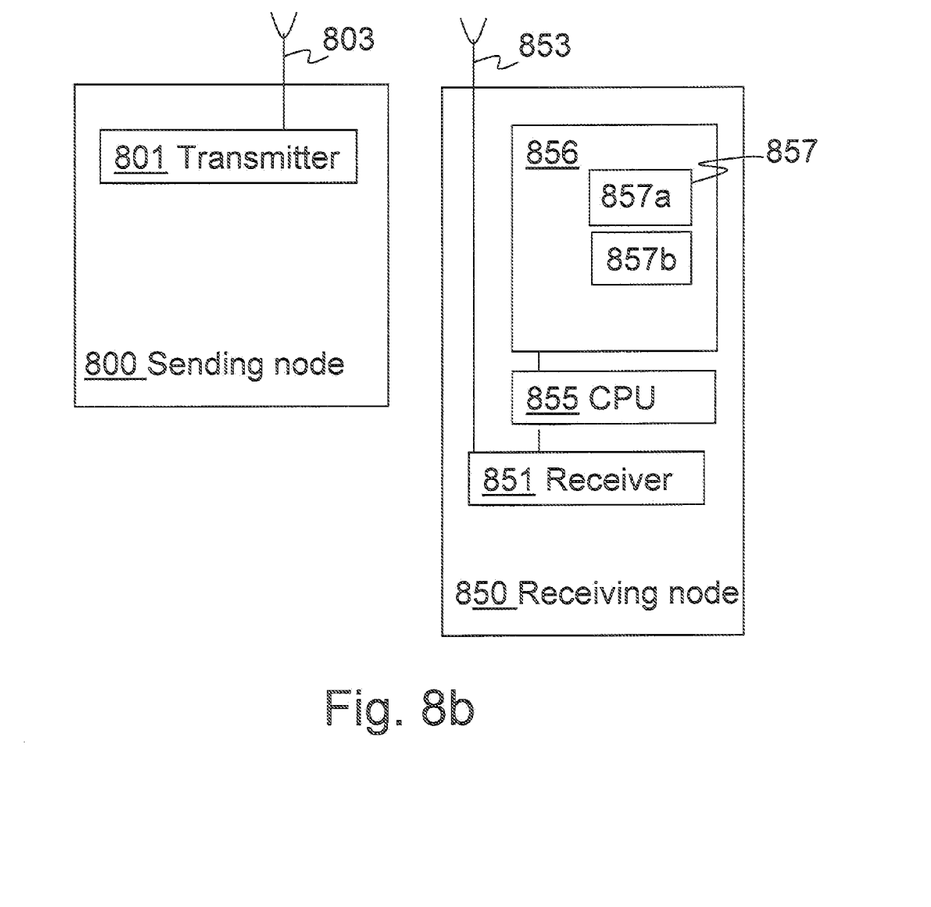

FIG. 8b schematically illustrates an embodiment of the receiving node 850, which is an alternative way of disclosing the embodiment illustrated in FIG. 8a. The receiving node 850 comprises a receiver 851 connected to an antenna 853 via an antenna port, as already described above with reference to FIG. 8a. The receiving node 850 also comprises a Central Processing Unit (CPU) 855 which may be a single unit or a plurality of units. Furthermore, the receiving node 850 comprises at least one computer program product 856 in the form of a non-volatile memory, e.g. an EEPROM (Electrically Erasable Programmable Read-Only Memory), a flash memory or a disk drive. The computer program product 856 comprises a computer program 857, which comprises code means which when run on the receiving node 850 causes the CPU 855 on the receiving node 850 to perform steps of the procedure described earlier in conjunction with FIG. 7.

Hence in the embodiment described, the code means in the computer program 857 of the receiving node 850 comprises a module 857a for enabling integrity protection of packets on the DRB indicated by the indicator received in the connection reconfiguration message, and a module 857b for disabling integrity protection on the rest of the DRBs. The code means may thus be implemented as computer program code structured in computer program modules. The modules 857a and 857b essentially perform the steps 720 and 730 of the flow in FIG. 7 to emulate the is receiving node 850 described in FIG. 8a. In other words, when the modules 857a and 857b are run on the CPU 855, they correspond to the processing unit 852 of FIG. 8a.

Although the code means in the embodiment, disclosed above in conjunction with FIG. 8b are implemented as a computer program modules, they may in alternative embodiments be implemented at least partly as hardware circuits.

Although the description above contains many specifics, they should not be construed as limiting but as merely providing illustrations of some presently preferred embodiments. The technology fully encompasses other embodiments which may become apparent to those skilled in the art. Reference to an element in the singular is not intended to mean "one and, only one" unless explicitly so stated, but rather "one or more." All structural and functional equivalents to the elements of the above-described embodiments that are known to those of ordinary skill in the art are intended to be encompassed hereby. Moreover, it is not necessary for a device or method to address each and every problem sought to be solved by the described technology for it to be encompassed hereby.

The description sets forth specific details, such as particular embodiments for purposes of explanation and not limitation. However, it will be appreciated by one skilled in the art that other embodiments may be employed apart from these specific details. In some instances, detailed descriptions of well known methods, interfaces, circuits, and devices are omitted so as not obscure the description with unnecessary detail. Individual blocks are shown in the figures corresponding to various nodes. Those skilled in the art will appreciate that the functions of those blocks may be implemented using individual hardware circuits, and/or using software programs and data, in conjunction with a suitably programmed digital microprocessor or general purpose computer. Nodes that communicate using the air interface also have suitable radio communications circuitry. It will be recognized that various actions may be performed by specialized circuits (e.g., analog and/or discrete logic gates interconnected to perform a specialized function), by one, or more processors programmed with a suitable set of instructions, or by a combination of both. The term "circuitry configured to" perform one or more described actions is used herein to refer to any such embodiment (i.e., one or more specialized circuits and/or one or more programmed processors). Moreover, the technology can additionally be considered to be embodied entirely within any form of computer-readable memory, such as solid-state memory, magnetic disk, or optical disk containing an appropriate set of computer instructions that would cause a processor to carry out the techniques described herein.

The invention claimed is:

1. A method in a sending node of a wireless communications system for supporting enabling and disabling of integrity protection of at least one data radio bearer between the sending node and a receiving node, the method comprising:
   releasing a connection between the sending node and the receiving node, the connection associated with the at least one radio bearer, and suspending transmission on the at least one data radio bearer;
   re-establishing the connection between the sending node and the receiving node; and
   transmitting a connection reconfiguration message to the receiving node, the connection reconfiguration message comprising an indication indicating that the at least one data radio bearer shall have enabled integrity protection when the at least one data radio bearer resumes transmission.

2. The method according to claim 1, wherein the transmitted connection reconfiguration message is a Radio Resource Control, RRC, connection reconfiguration message following an RRC connection re-establishment.

3. The method according to claim 1, wherein integrity protection comprises:
   adding an integrity protection checksum to a transmitted packet,
   verifying an integrity protection checksum in a received packet, and
   discarding the received packet when the verification of the integrity protection checksum fails.

4. The method according to claim 1, wherein the receiving node is a relay node.

5. The method according to claim 1, wherein the receiving node is a user equipment.

6. The method according to claim 1, wherein the sending node is a radio base station.

7. A method in a receiving node of a wireless communications system for enabling and disabling integrity protection of at least one data radio bearer between a sending node and the receiving node, the method comprising:
   releasing a connection between the sending node and the receiving node, the connection associated with the at least one radio bearer, and suspending transmission on the at least one data radio bearer;
   re-establishing the connection between the sending node and the receiving node:
   receiving a connection reconfiguration message from the sending node, the connection reconfiguration message comprising an indication indicating that the at least one data radio bearer shall have enabled integrity protection when the at least one data radio bearer resumes transmission, and
   enabling integrity protection of packets on the at least one data radio bearer indicated by the indication.

8. The method according to claim 7, wherein the received connection reconfiguration message is a Radio Resource Control, RRC, connection reconfiguration message following an RRC connection re-establishment.

9. The method according to claim 7, wherein integrity protection comprises:
   adding an integrity protection checksum to a transmitted packet, verifying an integrity protection checksum in a received packet, and discarding the received packet when the verification of the integrity protection checksum fails.

10. The method according to claim 7, wherein the receiving node is a relay node.

11. The method according to claim 7, wherein the receiving node is a user equipment.

12. The method according to claim 7, wherein the sending node is a radio base station.

13. A sending node for a wireless communications system, configured to support enabling and disabling of integrity protection of at least one data radio bearer between the sending node and a receiving node, the sending node comprising a transmitter configured to transmit a connection reconfiguration message to the receiving node following a release and a successful re-establishment of a connection between the sending node and the receiving node, the connection reconfiguration message comprising an indication indicating which ones of the at least one data radio bearers associated with the connection shall have enabled integrity protection when the at least one data radio bearers resume transmission.

14. The sending node according to claim 13, wherein the transmitted connection reconfiguration message is a Radio Resource Control, RRC, connection reconfiguration message following an RRC connection re-establishment.

15. The sending node according to claim 13, wherein integrity protection comprises:

adding an integrity protection checksum to a transmitted packet, verifying an integrity protection checksum in a received packet, and discarding the received packet when the verification of the integrity protection checksum fails.

16. The sending node according to claim 13, wherein the sending node is a radio base station.

17. A receiving node for a wireless communications system, configured to enable and disable integrity protection of at least one data radio bearer between a sending node and the receiving node, the receiving node comprising:

a receiver configured to receive a connection reconfiguration message from the sending node following a release and a successful re-establishment of a connection between the sending node and the receiving node, the connection reconfiguration message comprising an indication indicating which ones of the at least one data radio bearers associated with the connection shall have enabled integrity protection when the at least one data radio bearers resume transmission, and a processing unit configured to enable integrity protection of packets on the at least one data radio bearer indicated by the indication, and to disable integrity protection of packets on the rest of the at least one data radio bearers.

18. The receiving node according to claim 17, wherein the received connection reconfiguration message is a Radio Resource Control, RRC, connection reconfiguration message following an RRC connection re-establishment.

19. The receiving node according to claim 17, wherein integrity protection comprises:

adding an integrity protection checksum to a transmitted packet, verifying an integrity protection checksum in a received packet, and discarding the received packet when the verification of the integrity protection checksum fails.

20. The receiving node according to claim 17, wherein the receiving node is a relay node.

21. The receiving node according to claim 17, wherein the receiving node is a user equipment.

* * * * *